No. 674,803. Patented May 21, 1901.
E. G. THUNELL.
APPARATUS FOR CUTTING CHEESE.
(Application filed Aug. 7, 1900.)

(No Model.)

Witnesses:

Inventor:
Eric Gustaf Thunell
by Henry Orth
Atty

UNITED STATES PATENT OFFICE.

ERIC GUSTAF THUNELL, OF GOTENBORG, SWEDEN.

APPARATUS FOR CUTTING CHEESE.

SPECIFICATION forming part of Letters Patent No. 674,803, dated May 21, 1901.

Application filed August 7, 1900. Serial No. 26,181. (No model.)

*To all whom it may concern:*

Be it known that I, ERIC GUSTAF THUNELL, a subject of the King of Sweden and Norway, residing at Gotenborg, Sweden, have invented certain new and useful Improvements in Apparatus for Cutting Cheese; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to an apparatus for cutting cheese which is so arranged that the knife simultaneously with its cutting motion is automatically approached to that surface of the cheese from which the slices are to be cut off, whereby slices of the same thickness are always obtained, it being necessary during the cutting to only carry the knife in a certain direction without especially directing the same.

Figure 1:
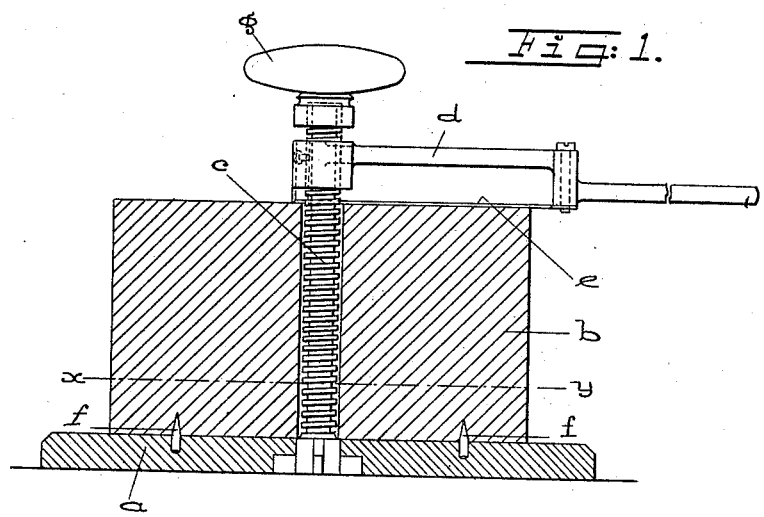
Figure 2:
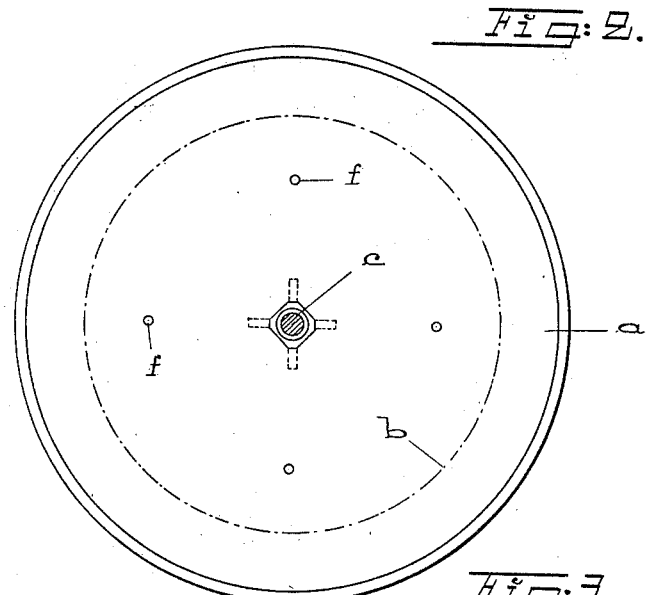
Figure 3:
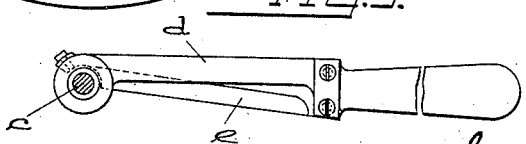

In the annexed drawings, Figure 1 shows the cheese-cutting apparatus, partly from the side and partly in section. Fig. 2 illustrates the same from above in section through $x\ y$ in Fig. 1, and Fig. 3 shows the knife from the top.

The apparatus is provided with a bed-plate $a$, serving as support for the cheese $b$ to be cut. In the middle of the plate there is secured a standard or upright $c$, over which the cheese is passed after a suitable opening has been bored out in the middle. The upright, as illustrated in the drawings, is fashioned as a screw, upon which an arm $d$, projecting at a right angle from the upright, is screwed. This arm supports the knife $e$, secured to the arm and parallel with the latter in such a way that a space is formed between the arm and the knife, as shown. The arm is then first screwed down on the upright, so that the knife $e$ rests on the cheese, and the screwing of the arm $d$ being then continued the knife must enter into the cheese and cut off a slice in proportion to the feeding down on the upright, such slice having sufficient space to enter between the knife and the arm $d$. In this way by means of the continued rotation of the knife-arm around the upright the whole cheese is cut down to the bed-plate $a$. To prevent the cheese turning on the upright during the cutting, the bottom plate $a$ can be provided with a number of upright points $f$, holding the cheese.

On the upper end of the upright there may when the arm has been screwed on be screwed a handle $g$, by means of which the apparatus is held during the cutting.

Having now particularly described and ascertained the nature of this invention and in what manner the same is to be performed, I declare that what I claim is—

A cheese-cutter comprising a stationary support for the cheese, a screw-threaded standard rising therefrom and adapted to pass axially through the cheese to be cut, and a knife provided at one end with a handle and at the other end with a nut fitting the screw-thread on said standard, for the purpose set forth.

In testimony that I claim the foregoing as my invention I have signed my name in presence of two subscribing witnesses.

ERIC GUSTAF THUNELL.

Witnesses:
H. J. ROSENQUIST,
SWEN. FRANK.